(12) United States Patent
Enomoto (10) Patent No.: US 6,507,704 B2
(45) Date of Patent: Jan. 14, 2003

(54) PSEUDO-ZOOM CAMERA AND IMAGE PROCESSING SYSTEM USING THE PSEUDO-ZOOM CAMERA

(75) Inventor: Jun Enomoto, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/970,924

(22) Filed: Oct. 5, 2001

(65) Prior Publication Data

US 2002/0118964 A1 Aug. 29, 2002

(30) Foreign Application Priority Data

Oct. 6, 2000 (JP) ......................................... 2000-307206

(51) Int. Cl.[7] .......................... G03B 17/24; H04N 1/387
(52) U.S. Cl. ........................... 396/60; 396/311; 355/40; 358/451; 358/453; 358/487; 358/302
(58) Field of Search .................... 396/60, 311; 355/40; 358/538, 506, 487, 451, 453, 302; 348/96, 231.6, 240.2

(56) References Cited

U.S. PATENT DOCUMENTS

| | | | | |
|---|---|---|---|---|
| 3,490,844 A | * | 1/1970 | Sapp, Jr. | 355/40 |
| 4,482,924 A | * | 11/1984 | Brownstein | 358/302 |
| 5,499,068 A | * | 3/1996 | Satoh et al. | 396/60 |
| 6,226,070 B1 | * | 5/2001 | Yamamoto | 355/40 |
| 6,400,908 B1 | * | 6/2002 | Parulski | 396/311 |

* cited by examiner

Primary Examiner—W. B. Perkey
(74) Attorney, Agent, or Firm—Birch, Stewart, Kolasch & Birch, LLP (57) ABSTRACT

This invention relates to a pseudo-zoom camera and an image processing system using the camera in which any of the pseudo-zoom magnification and the pseudo-zoom magnification number, or any of the pseudo-zoom magnification and the pseudo-zoom magnification number in combination with the picture area are recorded as pseudo-zoom information.

28 Claims, 8 Drawing Sheets

PSEUDO-ZOOM CAMERA AND IMAGE PROCESSING SYSTEM USING THE PSEUDO-ZOOM CAMERA

BACKGROUND OF THE INVENTION

1. Field of the Invention

The present invention relates to an image processing system in which an image having an angle of view different from that of a corresponding image actually photographed with a camera can be formed as a pseudo-zoomed print, and a pseudo-zoom camera used for the image processing system.

2. Description of the Related Art

In ordinary photographic printing systems, an image photographed on a film is printed at a standard printing magnification such that the entire photographed image area generally lies within an area of a photosensitive member having a certain size. On the other hand, a technique called digital zoom or pseudo-zoom is known which prints an image photographed on a film in such a manner that a predetermined central area of the image obtained by removing top, bottom, left-hand and right-hand portions of the photographed image each defined by a predetermined distance from the corresponding side is printed on a photosensitive member having the above-mentioned size at a magnification greater than the above-mentioned standard magnification. Cameras having a function of performing such pseudo-zoom function have been developed.

For example, JP 5-158111 A discloses a finder and a camera using the finder, the finder having an ordinary photography function, a pseudo-zoom photography function, i.e., designating an image area to be printed at a desired trimming magnification with respect to an area to be printed in ordinary photography, and a panoramic photography function, designating an area to be printed by removing top and bottom portions of an area to be printed in ordinary photography, the finder capable of changing the visual field area according to each photography function. The visual field area in the finder is changed according to each photography function so that the area to be actually printed from the image photographed by the photography function is indicated as a visual field area, so that an image viewed through the finder by a photographer coincides with the actually printed image, thereby ensuring that the photographer feels the printed image accord with the photographer's intention without giving any unnatural feeling to him/her.

JP 5-303129 A discloses a camera capable of changing the photography frame size in which the upper limit of the trimming magnification in pseudo-zoom is controlled, depending on the photography frame size on a film to prevent deterioration of granularity and lowering of resolution of a print in pseudo-zoom photography.

JP 6-266003 A discloses a camera capable of selecting any of a pseudo-zoom mode and a panoramic mode other than an ordinary photography mode in which, to obtain a high-quality image by such a construction where the panoramic mode cannot be set when the pseudo-zoom mode is selected to obtain a print which produces a pseudo-zoom effect.

JP 11-242261 A discloses a photographic camera for use in a pseudo-zoom printing system in which information on the pseudo-zoom magnification of each photographed frame is written into a photographic film or a recording medium provided in a film cartridge, the information on the pseudo-zoom magnification is read out during photograph printing, and the image area corresponding to the pseudo-zoom magnification is printed. A photographer taking a picture using this camera can easily select the pseudo-zoom magnification in accordance with the photographer's intention by visually confirming the image area corresponding to the pseudo-zoom magnification through a finder optical system.

Further JP 11-242289 A discloses a camera having a zoom lens as a picture-taking lens and a pseudo-zoom function, which is designed to improve operability by integrating the zoom function of the picture-taking lens and the pseudo-zoom function, so that a photographer using the zoom functions does not have any desirable feeling.

However, in the conventional cameras and photographic printing systems having pseudo-zoom functions, however, the method of designating in a photographed image a trimmed area to be printed is for center-timing such that the printed area is determined basically in a given size about a center of the frame when a photographer designates a pseudo-zoom magnification. The photographer cannot designate a particular printed area in the frame at will.

There are also problems that a print image quality by the pseudo-zoom function based on the conventional arts is not satisfactory.

SUMMARY OF THE INVENTION

In view of the above-described problems of the conventional art, it is an object of the present invention to provide a pseudo-zoom camera and an image processing system with which a photographer can take a picture by at the photographer's will, selecting a pseudo-zoom magnification and an image area when using a pseudo-zoom function, enabling printing with improved image quality when used the pseudo-zoom function. direction.

In order to overcome the above-mentioned problems, in the first aspect of the present invention, the pseudo-zoom camera is provided, in which at least a pseudo-zoom magnification is recorded as pseudo-zoom information on a photographic film, a film cartridge or a recording medium, and with which a service is available in which the pseudo-zoom magnification in pseudo-zoom information is read out at photographic printing and a picture area corresponding to the pseudo-zoom magnification is printed from a photographed image, the camera comprising: at least one of a pseudo-zoom magnification designation unit which designates the pseudo-zoom magnification and a pseudo-zoom pattern designation unit which designates a number representing a pseudo-zoom pattern obtained by patterning the pseudo-zoom pattern; or at least one of the pseudo-zoom magnification designation unit and said pseudo-zoom pattern designation unit, and a picture area designation unit which designates said picture area, wherein any of the pseudo-zoom magnification and the pseudo-zoom magnification number, or any of the pseudo-zoom magnification and the pseudo-zoom magnification pattern in combination with the picture area is recorded as pseudo-zoom information.

In a camera of the first aspect, it is preferable that the pseudo-zoom information can be recorded by each frame, each sequence of exposures, each designated area, or each image.

Therein, it is preferable that any of the pseudo-zoom information is recorded, when the photographic film, the film cartridge and the recording medium is fabricated, when any of the photographic film, the film cartridges and the recording medium is loaded into the camera, when any of the photographic film, the film cartridge and the recording medium is taken out from the camera, and any of when, before, and after the image is photographed.

Further, therein, it is preferable that the pseudo-zoom information is selected and designated from a plurality of kinds prepared in the pseudo-zoom printing service.

Furthermore, therein, it is preferable that the pseudo-zoom information comprises information items designated as a set with respect to a vertical and horizontal directions of the picture area, or designated with respect to a vertical and horizontal directions, separately.

Furthermore, therein, it is preferable that the pseudo-zoom magnification designated by the pseudo-zoom magnification designation unit or the pseudo-zoom pattern designated by the pseudo-zoom magnification pattern designation unit is limited corresponding to a kind of film.

Furthermore, therein, it is preferable that the pseudo-zoom magnification designated by the pseudo-zoom magnification designation unit or the pseudo-zoom pattern designated by the pseudo-zoom magnification pattern designation unit is limited corresponding to an exposure condition.

Additionally, in order to overcome the above-mentioned problems in a same way, in the second aspect of the present invention, an image processing system is provided, in which pseudo-zoom information recorded by the pseudo-zoom camera capable of recording a pseudo-zoom information is read out the pseudo-zoom information recorded on any of a photographic film, a film cartridge and a recording medium, and a picture area corresponding to a pseudo-zoom magnification in the pseudo-zoom information is printed out or output as image data from a photographed image, the system comprising: a unit which changes at least one image processing condition of pseudo-zoom processing based on the pseudo-zoom magnification or the pseudo-zoom magnification pattern in said pseudo-zoom information.

Therein, it is preferable that the image processing condition comprises at least any of pre-filtering processing condition, sharpness processing condition, dodging processing condition, electronic zooming processing condition, a scanning condition, and aberration correction.

Further, therein, it is preferable that a plurality of kinds of the pseudo-zoom information are prepared and the image processing condition is changed depending on pseudo-zoom information selected and designated from among the plurality of kinds of the pseudo-zoom information.

Furthermore, therein, it is preferable that the pseudo-zoom processing is performed by each frame, each sequence of exposures, each designated area or each image.

Furthermore, therein, it is preferable that the pseudo-zoom magnification is designated so that frames having the same designated pseudo-zoom magnification are collectively scanned or images having the same designated pseudo-zoom magnification are collectively processed.

Furthermore, therein, it is preferable that all the frames are scanned under a scanning condition which is adjusted to one of the frames having the maximum pseudo-zoom magnification.

Furthermore, therein, it is preferable that the pseudo-zoom processing is performed for information items designated as a set with respect to a vertical direction and a horizontal direction of the picture area, or separately designated with respect to the vertical direction and the horizontal direction.

Furthermore, therein, it is preferable that the pseudo-zoom processing is performed, while an ordinary electronic zooming processing is performed.

Furthermore, therein, it is preferable that the read pseudo-zoom information can be changed or canceled.

Furthermore, therein, it is preferable that the read pseudo-zoom information is changed so that an essential portion does not disappear from a predesired area by trimming based on the pseudo-zoom magnification in the pseudo-zoom information, and if the essential portion disappears from said predesired area even after changing the pseudo-zoom magnification, the information on the pseudo-zoom magnification is canceled.

Furthermore, therein, it is preferable that processing with respect to the essential portion is performed based on a result of automatic extraction of the essential portion or a result of a manual operation performed by an operator.

Furthermore, therein, it is preferable that if the read pseudo-zoom magnification exceeds the maximum magnification of the image processor, then a print is output or image data is output at maximum magnification of the image processor, the pseudo-zoom processing is prohibited, or a predetermined alarm is generated.

Furthermore, therein, it is preferable that the system enables selection of reflecting/non-reflecting a result of image processing including the pseudo-zoom processing in a test monitor.

Furthermore, therein, it is preferable that the system enables selection of reflecting/non-reflecting a result of image processing including the pseudo-zoom processing in an index print.

Furthermore, therein, it is preferable that if image data is output after the pseudo-zoom processing, any or both of the image data before the pseudo-zoom processing and the image data after the pseudo-zoom processing can be selected.

Furthermore, therein, it is preferable that any of combination of a high-image-quality mode in which the pseudo-zoom processing is realized by electronic zooming processing under scanning condition and a high-speed mode in which the pseudo-zoom processing is realized by electronic zooming processing, can be selected.

Furthermore, therein, it is preferable that the pseudo-zoom magnification in the pseudo-zoom processing is limited, depending on a kind of film.

Furthermore, therein, it is preferable that when a photographic date is recorded in the photographed image or corresponding to the photographed image and prior to a process of the pseudo-zoom, the photographic date is read out and recognized, and the recognized photographic date is recorded in the picture area after the process of the pseudo-zoom.

Optionally, therein, it is preferable that the camera is directed to the pseudo-zoom camera of the first aspect.

DESCRIPTION OF THE PREFERRED EMBODIMENT

A preferred embodiment of the present invention, in which the invention is applied to a pseudo-zoom camera and to an image processing system, will be described in detail with reference to the accompanying drawings.

Figure 1:
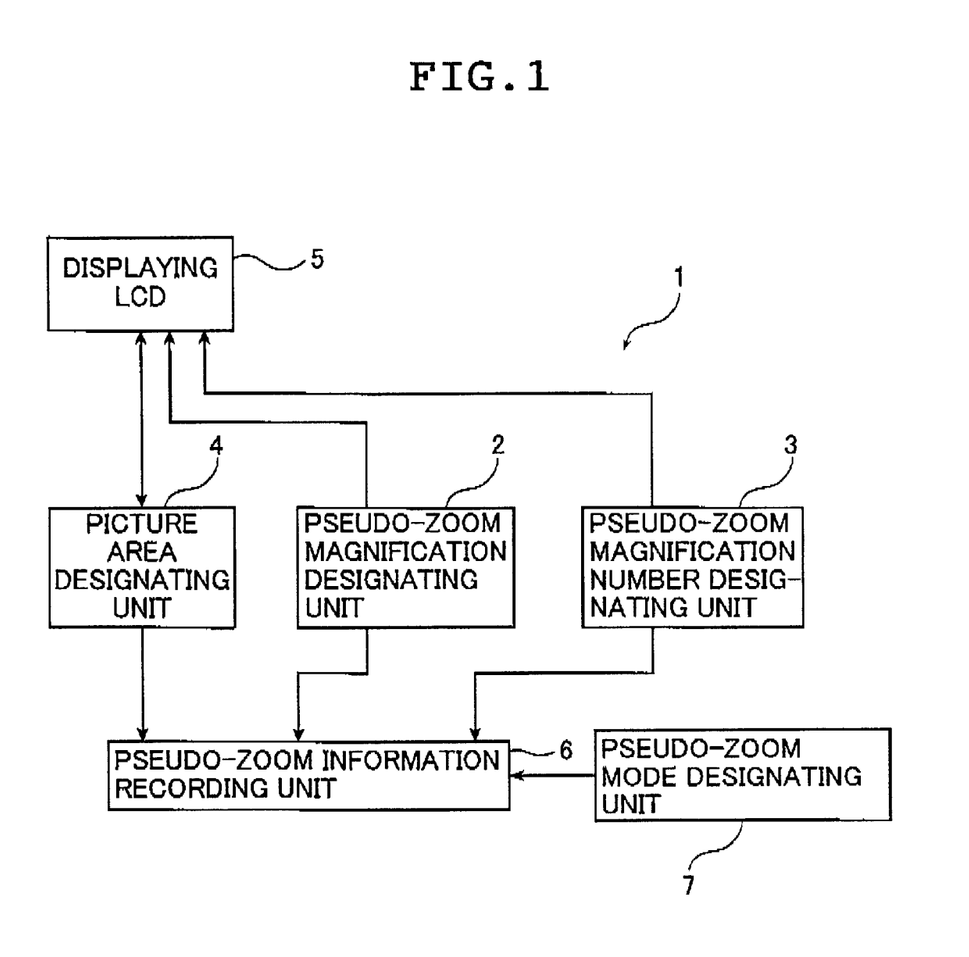
FIG. 1 is a block diagram schematically showing a pseudo-zoom information recording unit of a pseudo-zoom camera in an embodiment of the present invention.

FIG. 1 is a block diagram schematically showing a pseudo-zoom information recording unit 1 of a pseudo-zoom camera in an embodiment of the present invention. As shown in FIG. 1, the pseudo-zoom information recording unit 1 is constituted by a pseudo-zoom magnification designation unit 2, a pseudo-zoom magnification number designation unit 3, a picture area designation unit 4, a liquid crystal display (displaying LCD) 5 for displaying information, a pseudo-zoom information recording unit 6, and a pseudo-zoom mode designation unit 7. These components are controlled by a central processing unit (CPU) (not shown) for controlling the entire camera.

The pseudo-zoom camera having a pseudo-zoom function in accordance with the present invention can apply to any kinds of cameras. It can be a film camera, an Advanced Photo System (APS) camera, a digital camera, a hybrid camera having the functions corresponding to those of film and digital cameras, or a throwaway camera.

The pseudo-zoom magnification designation unit 2 is directed to a unit through which a photographer designates a pseudo-zoom magnification by operating a button or the like provided in an upper or rear portion of the camera body. Information on the designated pseudo-zoom magnification is sent to the pseudo-zoom information recording unit 6. Designation of a pseudo-zoom magnification, described below in detail, can be performed by selecting one of a plurality of values set in advance or by inputting a particular magnification value as it stands.

The pseudo-zoom magnification number designation unit 3 is directed to a unit through which the photographer designates a pseudo-zoom magnification number representing a pseudo-zoom magnification by operating a button or the like provided in an upper or rear portion of the camera body, as does the photographer in the case of the above-described designation of a pseudo-zoom magnification. A plurality of pseudo-zoom magnifications are preset and magnification numbers are assigned to the preset pseudo-zoom magnifications. For example, a magnification number 1 is assigned to a magnification of 1.2, a magnification number 2 to a magnification of 1.4, and so on for correspondence between the camera and a printer which performs image processing. In this manner, the amount of information on the magnification to be stored can be reduced. The designated pseudo-zoom pattern such as information on the designated pseudo-zoom magnification pattern such as numbers is sent to the pseudo-zoom information recording unit 6.

The picture area designation unit 4, also described below in detail, is directed to a unit through which the photographer designates an area (picture area) to be output as a pseudo-zoom print from a photographed picture by operating a button or the like provided on the camera body while observing the photographed picture displayed on the LCD 5.

The LCD 5 is provided, e.g., within the finder and displays a normal photographed picture. When designated a pseudo-zoom magnification or a pseudo-zoom magnification number, a frame line indicating a picture area to be output as a pseudo-zoomed print is indicated, is displayed in a size corresponding to the pseudo-zoom magnification on the LCD 5. Alternatively, the pseudo-zoomed image itself can be displayed on the LCD 5. When a picture area is designated, information on, for example, coordinates defining the picture area is sent to the pseudo-zoom information recording means 6.

The pseudo-zoom mode designation unit 7 is directed to a unit through which the photographer designates a pseudo-zoom mode by operating, for example, a button provided on the camera body. The pseudo-zoom mode is selected from, for example, a high-image-quality mode in which pseudo-zoom is performed by electronic zooming processing under a scanning condition, and a high-speed mode in which pseudo-zoom is performed by electronic zooming processing alone. The designated pseudo-zoom mode is sent as a pseudo-zoom information item to the pseudo-zoom information recording means 6.

The pseudo-zoom information recording means 6 records, on a film, a film cartridge or any other recording medium, pseudo-zoom information including a pseudo-zoom magnification designated by the pseudo-zoom magnification designation unit 2, a pseudo-zoom magnification number designated by the pseudo-zoom magnification number designation unit 3, a picture area designated by the frame area designation unit 5, and/or a pseudo-zoom mode designated by the pseudo-zoom mode designation unit 7.

If the pseudo camera is a film camera, pseudo-zoom information can be optionally recorded as a bar code on a photographic film outside the image area or can be recorded on a magnetic recording portion of a photographic film. When an integrated circuit (IC) is embedded in a film cartridge, pseudo-zoom information can be electrically recorded in the IC.

If the pseudo-zoom camera is a digital camera, pseudo-zoom information can be attached to image data or can be recorded in a header of image data. Alternatively, pseudo-zoom information can be embedded in image data by an electronic watermark technique or the like.

A digital photoprinter including an image processor which processes an image photographed by a camera having the above-described pseudo-zoom function and outputs the processed image as a photographic print or image data will be hereinafter described.

Figure 2:
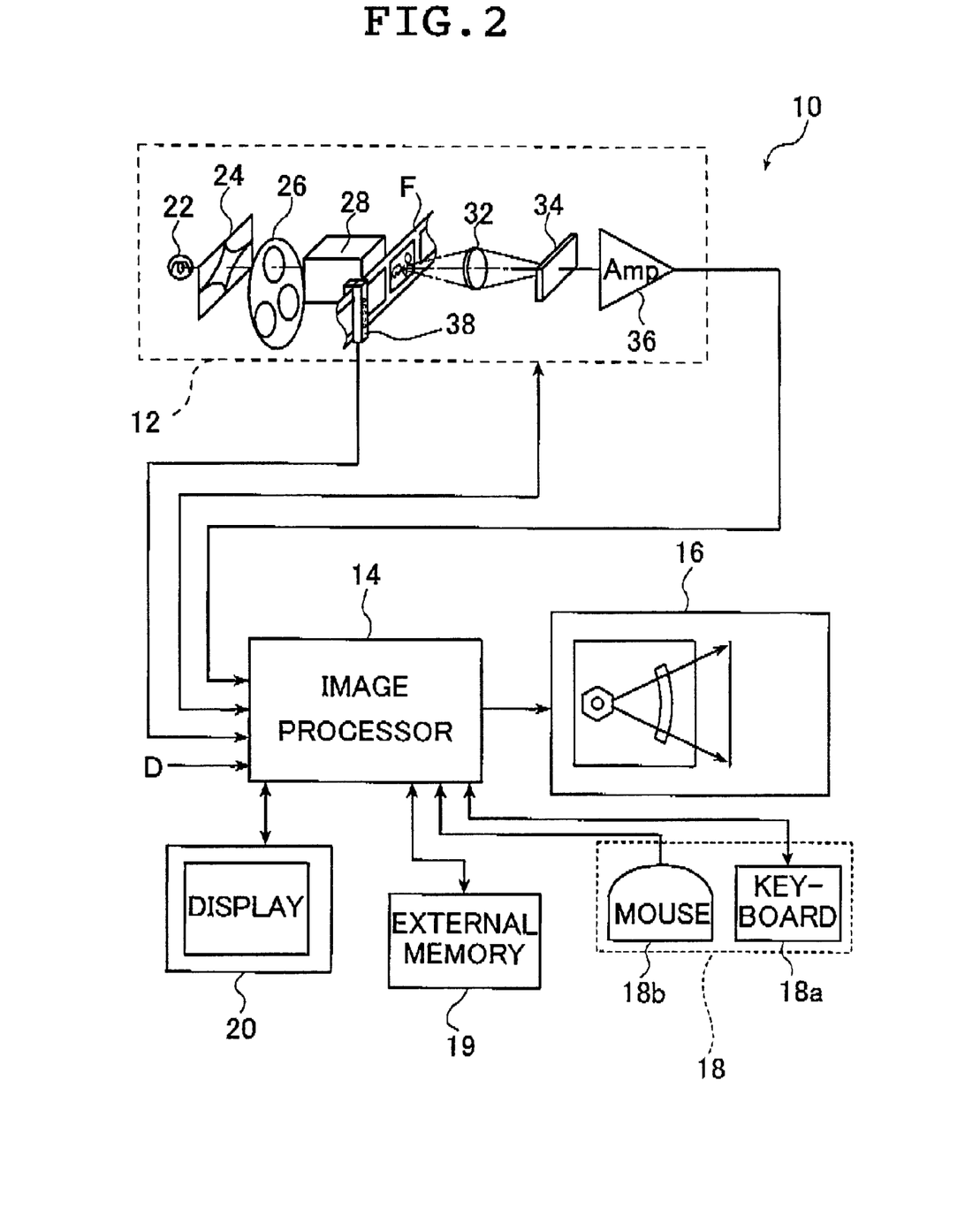
FIG. 2 is a block diagram schematically showing a digital photoprinter constituting an image processing system in the embodiment of the present invention.

Referring to FIG. 2, a digital photoprinter (hereinafter referred as "photoprinter") 10 comprises a scanner (image reader) 12 for photoelectrically reading out an image photographed in a film F; an image processor 14 which performs image processing of image data (image information) read from file F, and through which the entire photoprinter 10 is operated and controlled; and a printer 16 which exposures on a photosensitive member (photographic paper) with an optical beam modulated, depending on image data output from the image processor 14, and develops the exposed one on the photosensitive member to output the developed one as a finished point. The image processor 14 are connected to an operation system 18 comprising a keyboard 18a and a mouse 18b for selection from various kinds of processing and for inputting instructions to perform color/density correction, etc., an external memory 19 for storing data and processing programs necessary for execution of various kinds of image processing comprising pseudo-zoom processing, and for outputting image data, and a display 20 for displaying an image read using the scanner 12, various operation instructions, frames through which various conditions are set or registered, etc. The digital image data D obtained by e.g. using a digital camera or the like as well as image data read out from a film using the scanner 12 is input to the image processor 14.

The scanner 12 is a device for photoelectrically reading, frame by frame, image photographed on film F, etc. The scanner 12 comprises a light source 22, a variable diaphragm 24, a color filter plate 26 having three color filters of red (R), green (G) and blue (B) for decomposing an image into three primary colors which are red (R), green (G) and blue (B), and capable of be rotated, applying each of the desired color filters for filtering into an optical path, a diffuser box 28 for diffusing reading light incident on film F so that the light evenly diffuses over along the surface of film F, an imaging lens unit 32, a charge coupled device (CCD) sensor 34 which is an image read-out sensor (area sensor in this embodiment) for reading out one frame on film F, and an amplifier 36. Further, when pseudo-zoom information is optically recorded as a bar code at both edges of film F, the scanner 12 is provided with a bar code reader 38 for optically reading out the bar code. When pseudo-zoom information is magnetically recorded into film F, the scanner 12 is provided with a magnetic head for recording the information. When pseudo-zoom information is electrically recorded in an IC of a cartridge, the scanner 12 is provided with terminals for electrically reading the information.

In the photoprinter 10, special carriers are prepared which are attachable to the main body of the scanner 12, and which are selected in correspondence with the kinds and sizes of films such as APS 240 negative film and 138 negative (or reversal) film, the forms of film F such as strips and slides, and the kinds of processing for trimming, etc. Such carriers are interchanged for adaptation of various kinds of film and processing. Each of images (frames) which are photographed on film F and from which prints are formed in transported to and held at a predetermined read-out position by the carrier. The bar code reader 28 is placed so as to face the carrier on the transporting upstream side in the transport direction of the predetermined read-out position to read pseudo-zoom information when film F is transported to the predetermined read-out position. As mentioned above, if pseudo-zoom information is magnetically recorded on magnetic tracks provided at the edges of a film, as in APS 240 film, or recorded in an IC in a film cartridge, a unit for reading magnetic information or electrically recorded information is provided to read the pseudo-zoom information before the film is transported to the reading position. When digital image data is input directly to the image processor 14, pseudo-zoom information recorded, for example, in a header or the like of the digital image data is used in the image processor 14 as it stands.

Figure 3:
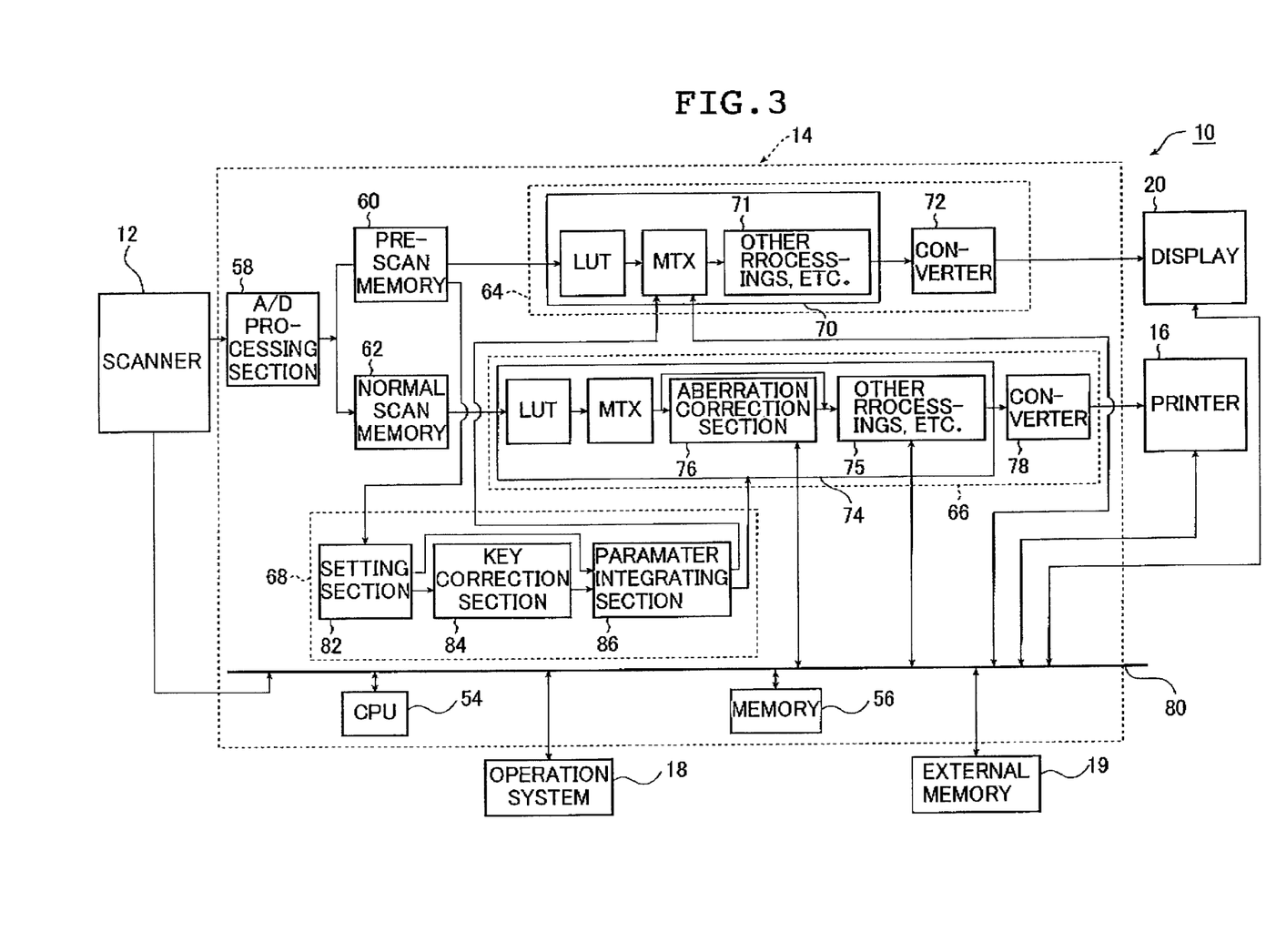
FIG. 3 is a block diagram schematically showing the image processor shown in FIG. 2.

An output signal (image data) from the scanner 12 is output to the image processor 14. FIG. 3 is a block diagram of the image processor 14. The image processor 14 has a CPU 54 for executing the controlling image processing including pseudo-zoom processing and for controlling the entire photoprinter 10, and an internal memory 56 for storing information necessary for the processing. The image processor 14 also comprises a data processing section 58, a pre-scanning memory 60, a normal scanning memory 62, a pre-scanning image processing unit 64, a normal scanning image processing unit 66, and a condition setting unit 68. The image processor 14 further comprises a unit for determining the aperture value of the variable diaphragm 24 and the accumulation time of the CCD sensor 34 at the time of normal scanning or the like. The operation system 18 and the display 20 are connected to related components by the CPU 54 through a CPU bus 80.

In the image processing system, R, G, and B signals output from the scanner 12 are processed by an A/D processing section 58 to be converted into digital image data, pre-scanning data being stored in the pre-scanning memory 60, normal scanning data being stored in the normal scanning memory 62. Pre-scanning data and normal scanning data are basically the same except that they differ in resolution (pixel density) and in signal level. Pre-scanning data stored in the pre-scanning memory 60 is processed in the pre-scanning image processing unit 64, while normal scanning data stored in the normal scanning memory 62 is processed in the normal scanning image processing unit 66. The pre-scanning image processing unit 64 comprises an image processing subunit 70 and an image data conversion section 72. The normal scanning image processing unit 66 comprises an image processing subunit 74 and an image data conversion section 78. Each of the image processing subunit 70 (hereinafter referred as processing section 70) of the pre-scanning image processing unit 64 and the image processing subunit 74 (hereinafter referred as processing section 74) of the normal scanning image processing unit 66 is a section for performing predetermined image processing on an image (image data) read with the scanner 12 under image processing conditions set by the condition setting unit 68 as described below. The processing sections 70 and 74 perform the substantially same processing except that they process groups of image data of different pixel densities. Ordinarily, the image processing in each of the processing sections 70 and 74 comprises, for example, color balancing, contrast correction (gradation processing), lightness correction, dodging processing (compression/expansion of the density dynamic range), saturation correction, sharpness (sharpening) processing, aberration correction processing, electric zooming(magnification) processing and prefilter processing and the like.

These kinds of processing are performed by well-known methods as a suitable combination of computation, processing based on look-up table (LUT), matrix (MTX) computation, processing using a filter, etc. In the illustrated example, color balancing, lightness correction and contract correction are performed by using LUTs, and saturation correction is performed by MTX computation. Other processings, sharpness processing, dodging processing, etc., are performed according to instructions from the operator, image data, etc., in blocks 71 and 75.

An aberration correction section 76 for correcting at least one of chromatic aberration of magnification and distortion and for performing electronic magnification zooming processing is provided between the MTX and the block 75 in the processing section 74 for processing normal scanning data.

The aberration correction section 76 corrects chromatic aberration of magnification and distortion and performs electronic zooming processing, using information read out from film F and supplied from the CPU 54, and which includes information on characteristics of a picture-taking lens, and information on positions in image data (pixels)

read out from the normal scanning memory 62 and processed by the various kinds of image processing, e.g., information on coordinate positions about the center of an image (the number of pixels along a line from the center pixel). Electronic zooming change processing performed by the aberration correction section 76 is image processing for magnification or reduction of size of image. That is, the zooming of an image (image data) is electronically changed so that the image has a given output image size. Ordinarily, this processing is performed by interpolating the image data.

The electronic zooming processing is not limited to a particular method, and any of various well-known methods of electronically changing the magnification, e.g., a method of using bilinear interpolation or a method of using spline interpolation can be used.

Image data processed in the processing sections 70 and 74 are supplied to the image data conversion sections 72 and 78. The image data conversion section 72 in the pre-scanning image processing unit 64 processes the image data from the processing section 70 by using a three-dimensional LUT or the like to convert the image data into a format suitable for display on the display 20. The image data conversion section 78 in the normal scanning image processing unit 66 is a section for processing the image data from the processing section 74 using a three-dimensional LUT to convert the image data into a format suitable for image recording in the printer 16.

Conditions under which processing in each of the pre-scanning image processing unit 64 and the normal scanning image processing unit 66 is performed are set by the condition setting unit 68. The condition setting unit 68 is constituted by an image processing condition setting section 82, a key correction section 84 and a parameter integration section 86.

The image processing condition setting section 82 (hereinafter referred as "setting section") selects a kind of image processing to be performed, and sets image processing conditions for processing in the processing sections 70 and 74 using pre-scanning data, and supplies them to the parameter integration section 86. Concretely, from pre-scanning data, the setting section 82 forms a density histogram and calculates image feature amounts such as an average density, a large area transmission density (LATD), a highlight (lowest density), and a shadow (highest density). Based on these data items and instructions provided by the operator using the operation system 18 if necessary, the setting section 82 determines/sets image processing conditions by forming LUTs for gray balancing, lightness correction and contrast correction and preparing a matrix computation process for saturation correction etc., and image processing condition such as parameters used in prefiltering process, selective shading process, aberration correction process and electric zooming process.

The key correction section 84 calculates the amounts of adjustment of image processing conditions (e.g., the amounts of correction of LUTs) according to various instructions input by the keyboard 18a to adjust the lightness, colors, contrast, sharpness, saturation, etc., by means of the keyboard 18a and the mouse 18b, and supplies the computed amounts to the parameter integration section 86. The parameter integration section 86 receives the image processing conditions set by the setting section 82, sets the specific image processing conditions in the processing section 70 in the pre-scanning image processing unit 64 and in the processing section 74 in the normal scanning image processing unit 66, and corrects (adjusts) the image processing conditions set in the respective sections corresponding to the amounts of adjustment computed by the key correction section 84, or again sets the image processing conditions.

An operation of this embodiment will be hereinafter described.

In this embodiment, a picture is taken, using the pseudo-zoom camera provided with the pseudo-zoom function, and the image processor performs pseudo-zoom processing to form a pseudo-zoomed print or output it as pseudo-zoomed image data.

Ordinarily, a photographer taking a picture using the pseudo-zoom camera to obtain a pseudo-zoomed print designates a pseudo-zoom magnification by operating the predetermined button while checking an image on the displaying LCD 5 in the finder. The arrangement can be such that the photographer can select any of use/non-use operations of the pseudo-zoom function before designating a pseudo-zoom magnification. In this case, a switch for activating the pseudo-zoom function is turned on to enable designation of a pseudo-zoom function, etc. The arrangement ensures that when the pseudo-zoom function is not activated, designation of a pseudo-zoom magnification is ineffective even if the pseudo-zoom magnification designation button is inadvertently pressed during taking a picture, thus preventing unintended pseudo-zoom is forming a print.

If such a pseudo-zoom function on/off function is not provided, the pseudo-zoom function is activated by pressing the pseudo-zoom magnification button.

Additionally, the displaying LCD can not be necessarily provided in such a case where there is no necessity to confirm a picture area by the pseudo-zoom, (i.e., a case where zooming magnification is fixed) and a case where frames at a plurality of steps are indicated, corresponding to a plurality of steps of pseudo-zoom magnification or the like.

Further, in the present embodiment, a size of a finder (visual field size) can be changed e.g. by supplying a mask over in the finder, etc., according on a pseudo-zoom magnification designated using the pseudo-zoom magnification designation button.

Figure 4A:
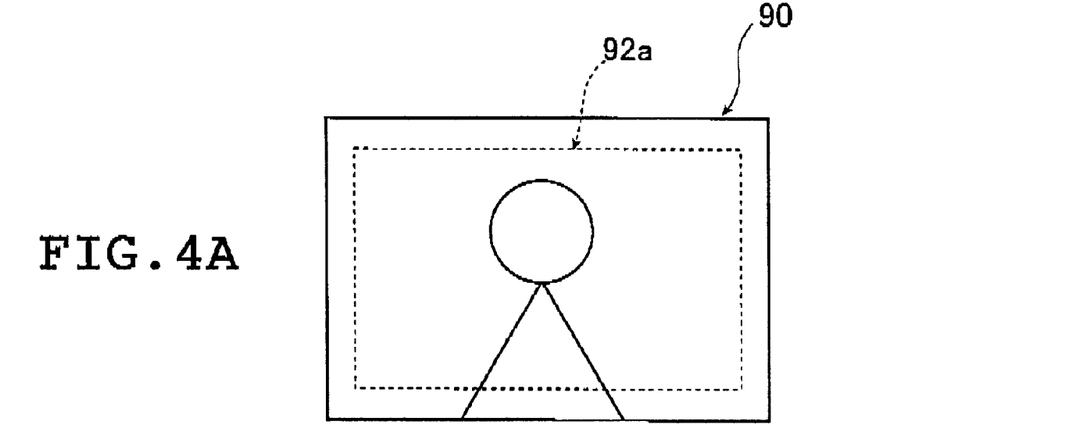
FIG. 4A is a diagram showing a state where a frame line indicating a picture area is displayed on an LCD.
Figure 4B:
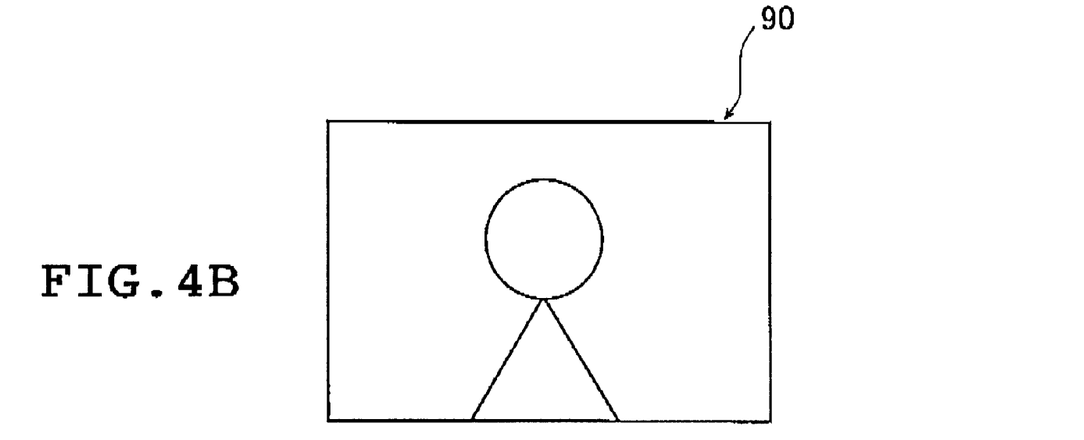
FIG. 4B is a diagram showing a state where a picture area to be output as a pseudo-zoomed print is fully displayed on the LCD.

Referring to FIG. 4A, when the pseudo-zoom magnification designation button is pressed, a frame line 92a indicating a picture area to be output as a pseudo-zoomed print according to a designated pseudo-zoom magnification is indicated in a normal photographed picture 90 displayed on the LCD 5. The area indicated by the frame line 92a is enlarged to an ordinary print size to be output as a pseudo-zoomed print. Then, to enable the photographer to check a state in which the print is supposed to be actually finished, the pseudo-zoomed image itself obtained by enlarging the area inside the frame line 92a, can be displayed as an actually printed picture area on the LCD 5, as shown in FIG. 4B.

Figure 4C:
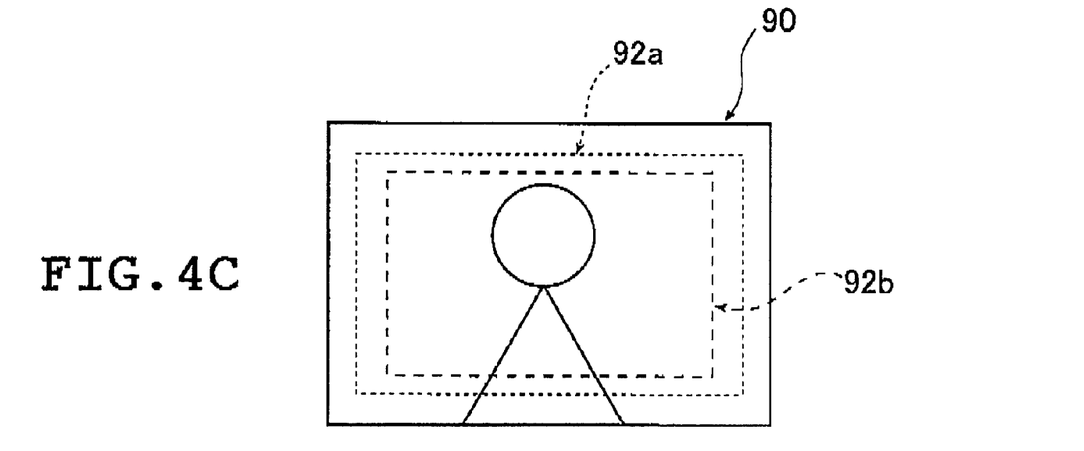
FIG. 4C is a diagram showing a state where a pseudo-zoom magnification is designated on the LCD.

The greater, the pseudo-zoom magnification becomes, the smaller, the frame defining the picture area becomes, such as a frame line 92b shown in FIG. 4C. When only a pseudo-zoom magnification is designated, trimming is basically performed as center trimming, and the picture area output as a pseudo-zoomed print is rectangular about a center of normal photographed picture 90.

Thus, if only a pseudo-zoom magnification is designated in the case of magnifying at the same magnification in the vertical and horizontal directions, a rectangular picture area is automatically determined. However, it is also possible to designate different pseudo-zoom magnification values with respect to the vertical and horizontal directions, respectively. If magnification in the vertical direction is increased relative to that in the horizontal direction, a photographed figure is finished so as to appear slenderish. If magnification in the horizontal direction is increased relative to that in the vertical direction, a photographed figure is finished so as to appear fattish. Also, if an image photographed on a high sensitivity film is enlarged, a problem relating to granularity, sharpness or the like arises. In such a case, therefore, the maximum designatable magnification can be limited on the camera side corresponding to the sensitivity of the film located in the camera. That is, the maximum designatable magnification can be limited, depending on the kind of film and exposure conditions to limit the range of pseudo-zoom magnifications or pseudo-zoom magnification numbers designatable on the camera side. It is assumed here that "kind of film" denotes sensitivity information and granularity information, or a film name if the film name is linked to sensitivity information. If a pseudo-zoom magnification exceeding such a limit is designated, it can be changed when pseudo-zoom processing to be able to prevent deterioration in image quality, as described below.

When the photographer presses, for example, an enter button while checking the image on the LCD 5 as described above, the pseudo-zoom magnification of the displayed image is set in the pseudo-zoom magnification designation unit 2 and sent to the pseudo-zoom information recording unit 6.

Figure 5:
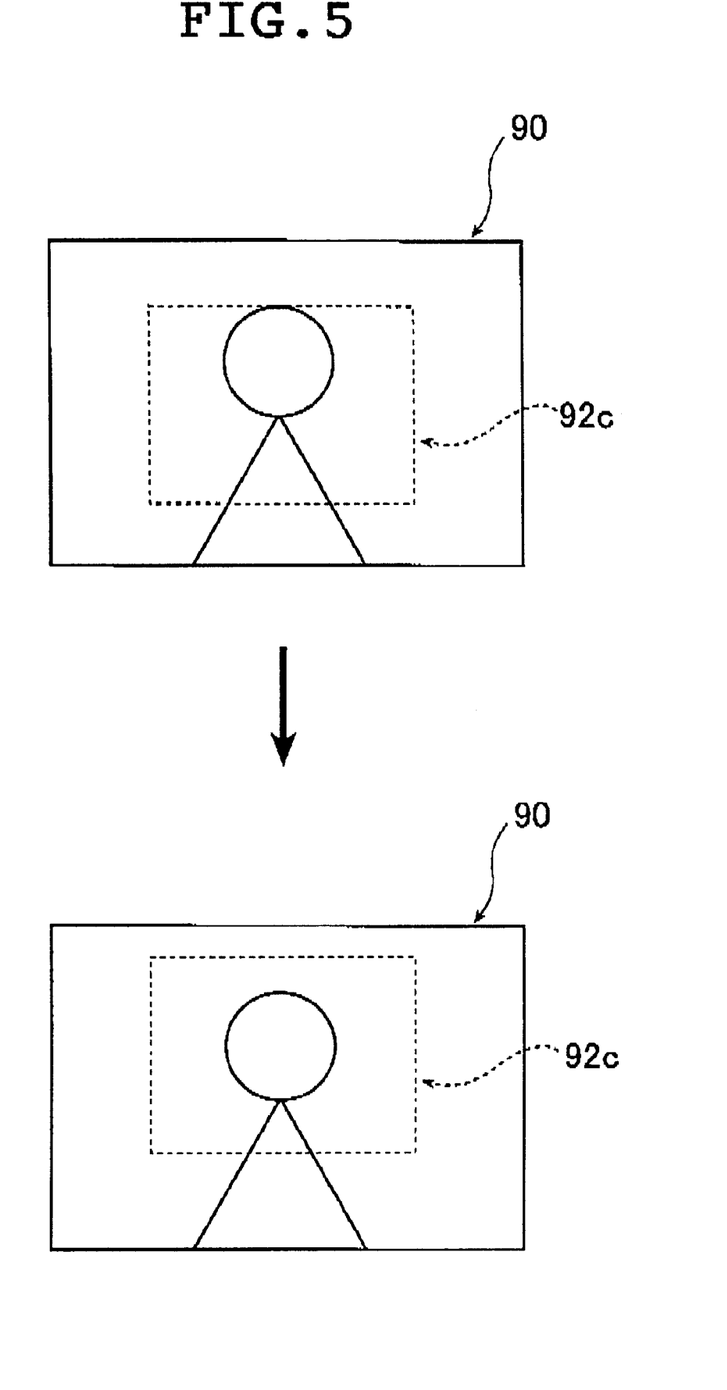
FIG. 5 is a diagram showing a state where a picture area is moved and designated.

When a pseudo-zoom magnification is designated during taking a picture, the direction of the camera can be changed so as to center a main subject in the picture area. It is necessary to also consider other cases, e.g., a case where it is impossible to do so, and a case where a pseudo-zoom magnification is designated after taking a picture using the digital camera. It is desirable that the picture area be freely designatable in such cases. In this embodiment, a picture area designation button is operated while checking the picture on the LCD 5 to move the picture area so that the main subject falls within the picture area indicated by a frame line 92c, as shown in FIG. 5. The picture area designation button is designed to enable movement in two directions: the up-down direction and the left-right direction. When a picture area enter button is pressed, the coordinates of the center of the selected picture frame in the coordinate system of the normal photographed picture are computed by the picture area designation unit 4 to be sent to the pseudo-zoom information recording unit 6.

A pseudo-zoom magnification designation method different from the above-described method of designating a particular pseudo-zoom magnification value can alternatively be used. That is, a plurality of pseudo-zoom magnifications can be set in advance, numbered as shown in the following Table 1, and each designated by selecting the corresponding number (pseudo-zoom magnification number).

TABLE 1

| Number | Pseudo-zoom magnification |
|---|---|
| 1 | 1.2 times |
| 2 | 1.4 times |
| 3 | 1.6 times |
| ... | ... |

When a pseudo-zoom magnification number designation button is pressed, a pseudo-zoom magnification number is indicated and a frame line determined by the pseudo-zoom magnification corresponding to the number is displayed on the LCD 5, thus enabling the pseudo-zoom magnification number to be designated as in the case of designation of a pseudo-zoom magnification. Further, a pseudo-zoom mode is designated by operating a pseudo-zoom mode designation button. If any pseudo-zoom mode is not designated, pseudo-zoom is performed in a preset mode or a mode designated by an operator on the image processing system side.

As described above, a pseudo-zoom magnification or a pseudo-zoom magnification number, a picture area and a pseudo-zoom mode are set as pseudo-zoom information in the pseudo-zoom information recording unit 6. Thereafter, when picture taking is actually performed, the pseudo-zoom information recording unit 6 records the pseudo-zoom information optically, magnetically or electrically on a film, a film carriage or a recording medium. Then, ordinary camera information including the power of the lens mounted on the camera is simultaneously recorded.

For example, in a case of a film camera, a bar code representing pseudo-zoom information is recorded as a latent image on the film outside the image area with a bar code writer when the film on which images are photographed is rewound. In this case, pseudo-zoom information is recorded at each single frame or each single image (in case of a digital camera). Alternatively, then, pseudo-zoom information can be recorded by each frame or by each image (in case of a digital camera). Further the information can be recorded by each sequence of exposures (by each roll of film or by each piece of recording medium in case of a digital camera). Furthermore, the information can be recorded by each designated area in a sequence of exposures. (In this specification, a term "sequence of exposures" is meant by a unit to be exposed in a developing shop to output a print by a customer's order, etc. or a unit to be digitally processed to output an image. A term "designated area" is meant by an area unit designated by a user or an operator etc. from among sequential frames of a photographic film or a recording medium such as Smart Media or Compact Flash. An area where pseudo-zoom information (bar code) can be designated by a user/an operator, by using a notch of a film or by providing a designation mark onto a header/footer of a recording medium.

It is considered that the method of recording pseudo-zoom information by designating pseudo-zoom magnification while taking a picture as described above is practical and reliable. However, the time at which pseudo-zoom information is recorded is not necessarily limited within the picture taking period.

For example, a certain pseudo-zoom magnification can be set before picture taking. And pictures can be taken at the fixed pseudo-zoom magnification through one sequence of exposures. Pseudo-zoom information about one frame can be recorded before picture taking on the frame. Alternatively, a pseudo-zoom magnification can be designated after picture taking. In such a case, if the camera is a film camera, the photographed image cannot be observed. It is not necessary to consider this drawback if a pseudo-zoom magnification is designated for a sequence of exposures. However, when a pseudo-zoom magnification is designated for each frame, it is determined more or less haphazardly. In the case of a digital camera or a hybrid camera, a photographed image can be again displayed to be observed for designation of a pseudo-zoom magnification, observing the image.

Also, a pseudo-zoom magnification can be designated and recorded when a film, a film cartridge or a recording medium is loaded into a camera. Conversely, pseudo-zoom magnification set with respect to a sequence of exposures of a film, a film cartridge, or the like can be recorded when the film or cartridge is taken out after the completion of picture taking. Further, a throwaway camera or the like can be shipped with a pseudo-zoom magnification recorded thereon, which is set when the film is manufactured. Also, when a film is manufactured, one pseudo-zoom magnification can be set with respect to all photography frames on the film and recorded on the film itself or on the film cartridge and the film can be shipped with the pseudo-zoom magnification indicated by labeling.

When a photographer who has taken ordinary pictures wishes to print pictures in a pseudo-zoom printing manner at when he/she orders at a laboratory, he or she can enter the necessary information in an order from (customer card) or the like in ordering. A customer can order a print by designating pseudo-zoom information (a magnification, an area, a mode, etc.) via a communication network such as the Internet. In such a case, an operator inputs the information to the photoprinter when processing.

In a laboratory, when a pseudo-zoom print order is received, e.g. if the order is for printing from a film, the film is first scanned using the scanner 12 to read out images.

In the digital photoprinter 10 arranged as shown in FIG. 2, there are two possible methods for realizing the pseudo-zoom function: a method of adaptation by changing a scanning condition (the number of pixels) and the electronic processing magnification (high-quality-image mode); and a method of adaptation by changing only the electronic processing magnification (high-speed mode). The method of adaptation by changing only the electronic processing magnification (high-speed mode) for pseudo-zoom has the drawback of reducing image quality when the pseudo-zoom magnification is high. However, since this method requires only changing the electronic processing magnification, it can be easily realized and ensures the same throughput.

One of the above-described high-image-quality mode and the high-speed mode can be selected and designated as a pseudo-zoom method by the pseudo-zoom mode designation unit 7 on the camera side, as described above, or can be selected by, for example, an operator on the image processing system side.

The method of adaptation by changing a scanning condition (the number of pixels) and the electronic processing magnification (high-image-quality mode) ensures a certain image quality level even when pseudo-zoom is performed. Also, this method requires changing the scanning condition according to a combination of a printing magnification and a pseudo-zoom magnification. Actually, there is a problem of up-and-down movement of the zoom lens and occurrence of slack in a film when the film is scanned frame by frame and, hence, a problem of considerable reduction in throughput occurs. There is also a problem a reduction in durability of the lens. The possibility of there problems becoming considerable is particularly high when the pseudo-zoom magnification is changed for each frame, or when activation or deactivation of the pseudo-zoom function is repeatedly performed for each frame. By considering this, the scanning condition can be adjusted to that for the frame with the maximum pseudo-zoom magnification and the other frames can be scanned under the adjusted scanning condition to limit the reduction in throughput.

Figure 6:
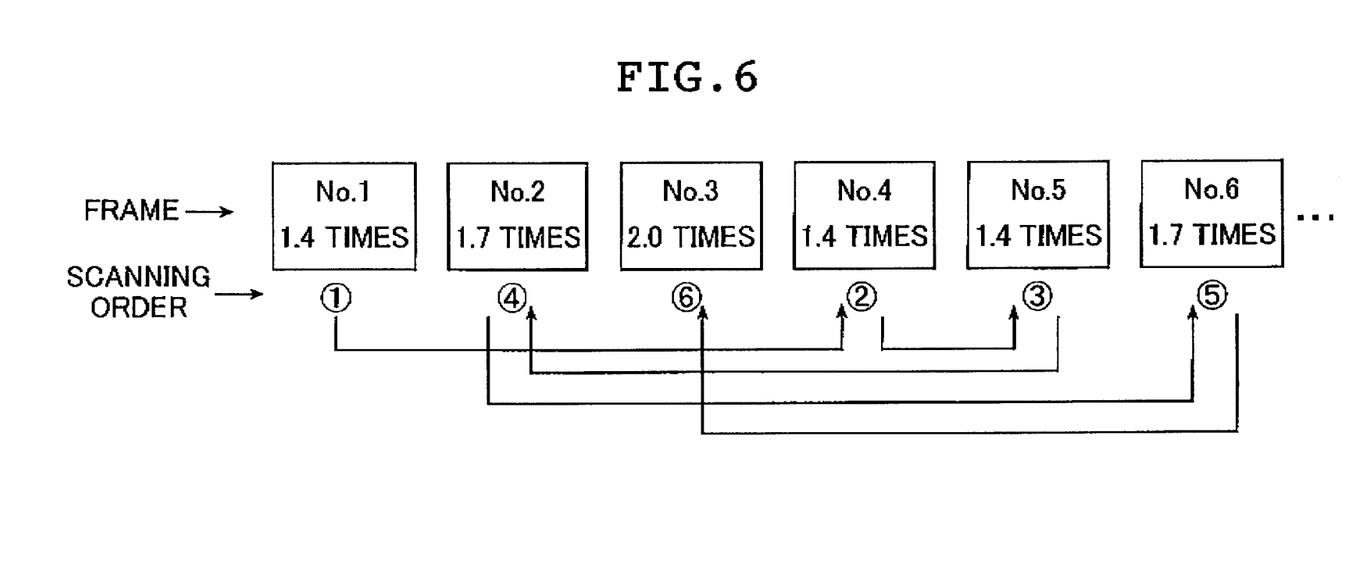
FIG. 6 is a diagram showing a state where frames having the same magnification are successively scanned.

Another method for preventing a reduction in throughput by successively scanning frames of the same pseudo-zoom magnification, as shown in FIG. 6, for example, can be used. Referring to FIG. 6, the first frame, the fourth frame and the fifth frame having a pseudo-zoom magnification of 1.4 are first scanned, and the second frame and the sixth frame having a pseudo-zoom magnification of 1.7 are next scanned. This method reduces the number of times that the lens of the scanner 12 is moved upward and downward to somewhat improve durability and life of the lens to some extent.

Image data obtained using the scanner 12 is supplied to the image processor 14. Pre-scanning data thereby obtained is stored in the pre-scanning memory 60, and normal scanning data is stored in the normal scanning memory 62, as described above. Pseudo-zoom information is sent to the image processing condition setting section 82 along with the photography information read simultaneously. The image processing condition setting section 82 sets conditions of pseudo-zoom processing based on these sorts of information. Actually, the pseudo-zoom function is realized by electronic zooming processing, and conditions of electronic zooming processing are set using this procedure.

Image processing conditions are set in the condition setting unit 68, the normal scanning data is processed under the set image processing conditions to be output as a finished print from the printer 16 or output as image data to the external memory 19. Processing of normal images is the same as the conventional processing, and the description will be made only with respect to points relating to pseudo-zoom processing.

Also when pseudo-zoom processing is not performed, ordinary electronic zooming processing (enlargement/reduction processing) is performed corresponding to an output image size. When a pseudo-zoom magnification is designated, electronic magnification zooming processing is performed twice as ordinary electronic zooming processing and pseudo-zoom electronic zooming processing. In such a case, reduction in image quality is considerable since twice-electronic zooming processing includes interpolation. Therefore, the two kinds of electronic zooming processing are combined into one to perform electronic zooming processing only once, thereby limiting the reduction in image quality. For example, in a case where an large-sized print is output from an image on a 135 film, electronic zooming processing is ordinarily performed at a magnification of 3.7 times. If a pseudo-zoom magnification is designated as 2, then electronic zooming processing at a magnification of 7.4 obtained by multiplying 3.7 by 2 is performed only one time, so that performing interpolation computation once suffices.

In the image condition setting section 82, various image processing conditions are set. When pseudo-zoom processing is performed, there is necessities to change, depending on the pseudo-zoom magnification, parameters of prefiltering processing, dodging processing, sharpness processing, etc., as well as those of electronic zooming processing. Preferably, sharpness processing is performed after electronic zooming processing and pseudo-zoom processing. As processing requiring changing image processing conditions corresponding to pseudo-zoom, image processing relating to image structure processing requiring changing parameters corresponding to the printing magnification, or the electronic processing magnification, etc., is basically mentioned.

When a magnification greater than that of the main system is designated on the camera side, the designated pseudo-zoom magnification is canceled and pseudo-zoom processing is performed at the maximum magnification on the image processor side. Further, designated pseudo-zoom magnification can be changed, finely adjusted or replaced with the maximum magnification on the image processor side, depending on other conditions, which are, e.g., film information items, including the kind of film, granularity information, passage of time. In case of a high sensitivity film, the pseudo-zoom magnification is reduced relative to that in the case of a low sensitivity film to limit the reduction in image quality since the reduction in image quality in terms of granularity or the like is considerable if the magnification is excessively high. Further, the pseudo-zoom magnification can be changed to other exposure conditions (such as aperture size or shutter speed) to limit the reduction in image quality. The pseudo-zoom magnification can be changed, depending on these conditions on the system e.g. image processor side at the time of pseudo-zoom processing. Alternatively, if these conditions can be taken into consideration, range within which the pseudo-zoom magnification can be set, can be restricted.

If the designated pseudo-zoom magnification exceeds the maximum magnification on the image processing system side, pseudo-zoom processing can be prohibited, an alarm can be issued, and a predetermined message is output to request instructions from the operator.

Image processing including pseudo-zoom processing is performed under the conditions set as described above. When, as a result of the processing a portion of the face of a figure or the like disappears form the pseudo-zoom printed picture area to be cut due to, for example, a customer's error in setting the pseudo-zoom magnification, it is desirable to change the pseudo-zoom magnification so that the face does not disappear therefrom.

Processing in such a case will be described with reference to the flowchart of FIG. 7.

Figure 7:
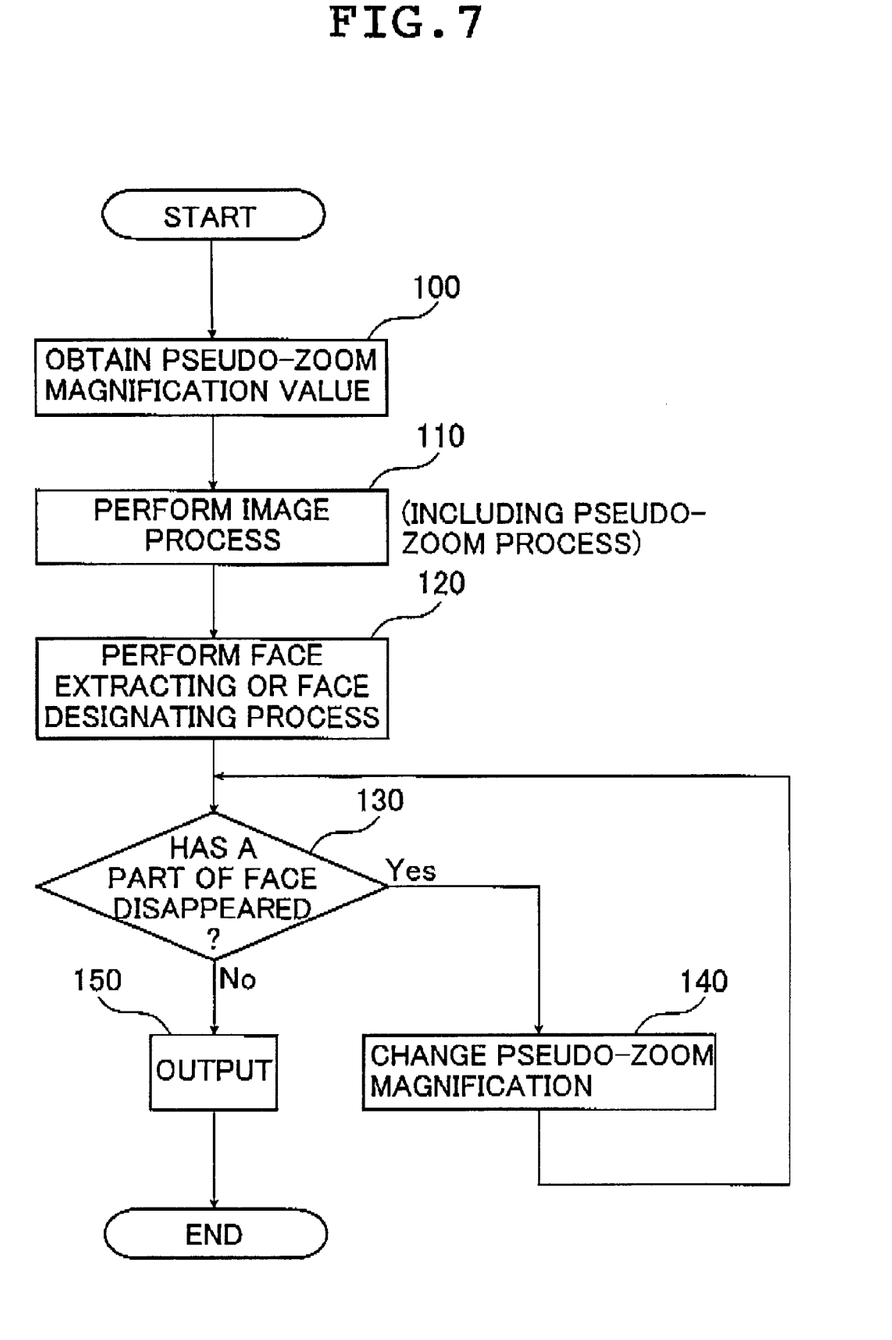
FIG. 7 is a flowchart showing a correction method in a case where a face is but by pseudo-zoom.

At step 100 shown in FIG. 7, the above-described pseudo-zoom magnification is obtained and conditions of image processing including pseudo-zoom processing are set in the image processing condition setting section 82. At step 110, image processing including pseudo-zoom processing is performed under the set conditions.

At step 120, a face area is extracted. This can be performed automatically or manually performed by the operator observing a test image displayed on display 20. In a case of automatic face area extraction, some of the face area extraction methods disclosed in the JP 4-346333 A, JP 5-165119 A, JP 6-067320 A, JP 7-258976 A, JP 8-091113 A, and JP 9-138470 A, which were disclosed by the assignee of this patent application, can be preferably applied to this case.

Figure 8:
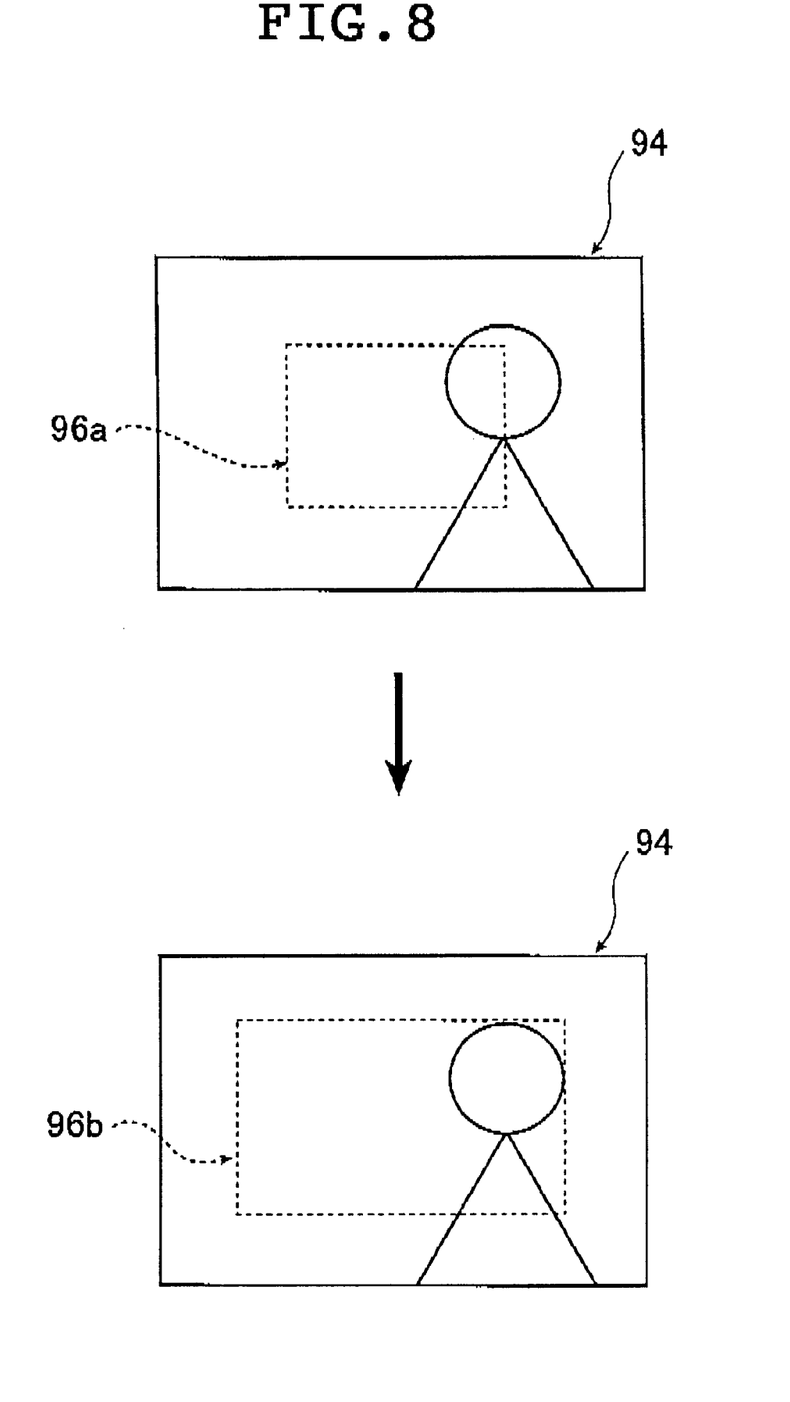
FIG. 8 is a diagram showing an image on a display for explanation of the correction method in the case where the face is cut by pseudo-zoom.

At the next step 130, determination is made as to whether any portion of the face disappears from the pseudo-zoom printed picture area or not. As shown in FIG. 8, when the pseudo-zoom magnification is excessively high and the picture area indicated by 96a in the photographed picture indicated by 94 is so small that the face disappears therefrom, the pseudo-zoom magnification is changed at step 140. It is again determined whether or not any portion of the face disappears from the pseudo-zoom printed picture area. Changing the pseudo-zoom magnification is repeated until the face disappears from the area. As the pseudo-zoom magnification is reduced, the face appears completely in the picture area 96b, as shown in FIG. 8. The process then advances to step 150, where the data is output to the printer 16, and a pseudo-zoom print is output from the printer 16 or the image data is output to the external memory 19.

The process can be programmed so that the pseudo-zoom magnification is automatically changed at a predetermined step, or the pseudo-zoom magnification can be manually changed by the operator observing the pseudo-zoom result shown on the display 20 (test monitor).

In the above-described case, if a part of the face disappears from a desired area, the pseudo-zoom magnification is adjusted by such alternation that the face does not disappear from the area. Alternatively, fine adjustment for displaying the entire face can be performed by moving the picture area as shown in FIG. 5 until the face falls in the picture area. When the picture area is automatically moved, the picture area can be moved so that the coordinates of a center of the extracted face area are coincidence with the coordinates of the center of the picture area.

In a case of fully automatic adjustment, it is not necessary to display the pseudo-zoomed result on the test monitor display 20. Therefore the system can be arranged to be able to select reflecting/non-reflecting the pseudo-zoom result in the test monitor.

Preferably, when a date such as photographic date is recorded during photographing an image of a single frame of a photographic film and prior to pseudo-zooming process, the date is read out using a scanner etc., regarding as the date such as image data. The photographic date is recognized from the read-out data. The recognized data is recorded in a valid picture area (valid area or print area) after pseudo-zooming proces. The preferable reason of the above process is based on following. If a pseudo-zoomed print is performed, an effect as same as a kind of trimming effect can be obtained. Depending on any case, the date (photographic date) indication disappears from the valid area (print area) i.e. the indication is off from the valid area, so that the indication will disappear. Further it is not necessary that a read-out date for recording the date (photographic date) in a valid picture area (valid area or print area) after pseudo-zooming lies in a picture area of a single frame of a photographic film. For example, the date can lie in a single picture of a recording medium in a digital camera. Alternatively, the date can be recorded corresponding to a single photographed image in a recording medium in a digital camera or a frame of film. In case of APS (Advanced Photo-System) film, the date can be recorded on a magnetic recording layer or in case of a digital camera, the date can be recorded on a header or a footer of recording medium.

Further, for the case of outputting an index print, the system can be arranged to be able to select reflecting/non-reflecting the pseudo-zoom result in the index print. This selection can be designated by the customer when ordering for printing, or the operator can independently make determination for designating it.

When outputting the processing result as image data to be recorded as a file (recording medium), the system can be arranged to be able to select any of outputting the image data after pseudo-zoom processing and outputting both the data before pseudo-zoom processing and the data after pseudo-zoom processing among outputting the image data before pseudo-zoom processing.

Image data obtained as a pseudo-zoomed output can be transmitted via a communication network such as the Internet or can be stored in a server on such a network. It can also be stored in a storage medium such as a compact disc-recordable (CD-R), Zip, a magneto-optic (MO) medium, a memory stick, or a multimedia card.

When different settings are made on the camera side and on the image processing system side, for example, data corresponding to a pseudo-zoom magnification designated on the camera side does not exist on the image processing system side, pseudo-zoom processing can be performed on the image processing system side at a pseudo-zoom magnification closest to the pseudo-zoom magnification set on the camera side, or the designation of pseudo-zoom can be canceled.

As above-described in detail, in this embodiment, pseudo-zoom based on digital image processing is added to optical zoom using a camera lens to improve high magnification. It is further possible to easily designate pseudo-zoom information with accuracy, thereby improving the image quality of a pseudo-zoom print, and making cameras (picture taking device) further attractive.

The pseudo-zoom camera and the image processing system in accordance with the present invention have been described in detail. However, the present invention is not limited to the described embodiment, and various changes and modifications of the described embodiment can be made without departing from the scope of the invention.

According to the present invention, pseudo-zoom information can be easily designated, a high magnification can be realized by adding pseudo-zooming operation to optical zooming operation, using a camera lens, and image quality of a pseudo-zoomed print can be improved.

What is claimed is:

1. A pseudo-zoom camera in which at least a pseudo-zoom magnification is recorded as pseudo-zoom information on a photographic film, a film cartridge or a recording medium, and with which a service is available in which said pseudo-zoom magnification in pseudo-zoom information is read out is photographic printing or image data outputting and a picture area corresponding to said pseudo-zoom magnification is printed as a photographic print or output as image data from a photographed image, comprising:

at least one of a pseudo-zoom magnification designation unit which designates said pseudo-zoom magnification and a pseudo-zoom pattern designation unit which designates a number representing a pseudo-zoom pattern obtained by patterning said pseudo-zoom pattern; or at least one of said pseudo-zoom magnification designation unit and said pseudo-zoom pattern designation unit, and a picture area designation unit which designates said picture area, wherein any of said pseudo-zoom magnification and said pseudo-zoom magnification number, or any of said pseudo-zoom magnification and said pseudo-zoom magnification pattern in combination with said picture area is recorded as pseudo-zoom information.

2. A camera according to claim 1, wherein said pseudo-zoom information can be recorded by each frame, each sequence of exposures, each designated area, or each image.

3. A camera according to claim 1, wherein any of said pseudo-zoom information is recorded, when said photographic film, said film cartridge and said recording medium is fabricated, when any of said photographic film, said film cartridge and said recording medium is loaded into said camera, when any of said photographic film, said film cartridge and the recording medium is taken out from said camera, and any of when, before, and after said image is photographed.

4. A camera according to claim 1, wherein said pseudo-zoom information is selected and designated from a plurality of kinds prepared in said pseudo-zoom printing service.

5. A camera according to claim 1, wherein said pseudo-zoom information comprises information items designated as a set with respect to a vertical and horizontal directions of said picture area, or designated with respect to a vertical and horizontal directions, separately.

6. A camera according to 1, wherein the pseudo-zoom magnification designated by said pseudo-zoom magnification designation unit or said pseudo-zoom pattern designated by said pseudo-zoom magnification pattern designation unit is limited corresponding to a kind of film.

7. A camera according to claim 1, wherein said pseudo-zoom magnification designated by said pseudo-zoom magnification designation unit or said pseudo-zoom pattern designated by said pseudo-zoom magnification pattern designation unit is limited corresponding to an exposure condition.

8. A camera according to claim 1, further comprising a pseudo-zoom mode designation unit, wherein one of a high-image-quality mode in which said pseudo-zoom processing is performed using a combination of a scanning condition and electronic zooming processing, and a high-speed mode in which the pseudo-zoom processing is performed by electronic zooming can be selected and designated.

9. An image processing system in which pseudo-zoom information recorded by said pseudo-zoom camera capable of recording a pseudo-zoom information is read out said pseudo-zoom information recorded on any of a photographic film, a film cartridge and a recording medium, and a picture area corresponding to a pseudo-zoom magnification in said pseudo-zoom information is printed out or output as image data from a photographed image, said system comprising:

a unit which changes at least one image processing condition of pseudo-zoom processing based on said pseudo-zoom magnification or said pseudo-zoom magnification pattern in said pseudo-zoom information.

10. A system according to claim 9, wherein said image processing condition comprises at least any of pre-filtering processing condition, sharpness processing condition, dodging processing condition, electronic zooming processing condition, a scanning condition, and aberration correction processing condition.

11. A system according to claim 9, wherein a plurality of kinds of said pseudo-zoom information are prepared and said image processing condition is changed depending on pseudo-zoom information selected and designated from among said plurality of kinds of the pseudo-zoom information.

12. A system according to claim 9, wherein said pseudo-zoom processing is performed by each frame, each sequence of exposures, each designated area or each image.

13. A system according to claim 9, wherein said pseudo-zoom magnification is designated so that frames having the same designated pseudo-zoom magnification are collectively scanned or images having the same designated pseudo-zoom magnification are collectively processed.

14. A system according to claim 9, wherein all the frames are scanned under a scanning condition which is adjusted to one of said frames having said maximum pseudo-zoom magnification.

15. A system according to claim 9, wherein said pseudo-zoom processing is performed for information items designated as a set with respect to a vertical direction and a horizontal direction of the picture area, or separately designated with respect to said vertical direction and said horizontal direction.

16. A system according to claim 9, wherein said pseudo-zoom processing is performed, while an ordinary electronic zooming processing is performed.

17. A system according to claim 9, wherein said read pseudo-zoom information can be changed or canceled.

18. A system according to claim 17, wherein said read pseudo-zoom information is changed so that an essential portion does not disappear from a predesired area by trimming based on said pseudo-zoom magnification in said pseudo-zoom information, and wherein if the essential portion disappears from said predesired area even after changing said pseudo-zoom magnification, said information on said pseudo-zoom magnification is canceled.

19. A system according to claim 18, wherein processing with respect to said essential portion is performed based on a result of automatic extraction of said essential portion or a result of a manual operation performed by an operator.

20. A system according to claim 9, wherein if the read pseudo-zoom magnification exceeds the maximum magnification of the image processor, then a print is output or image data is output at maximum magnification of said image processor, said pseudo-zoom processing is prohibited, or a predetermined alarm is generated.

21. A system according to claim 9, wherein said system enables selection of reflection/non-reflecting a result of image processing including said pseudo-zoom processing in a test monitor.

22. A system according to claim 9, wherein said system enables selection of reflection/non-reflecting a result of image processing including said pseudo-zoom processing in an index print.

23. A system according to claim 9, wherein if image data is output after said pseudo-zoom processing, any or both of said image data before said pseudo-zoom processing and said image data after said pseudo-zoom processing can be selected.

24. A system according to claim 9, wherein any of combination of a high-image-quality mode in which said pseudo-zoom processing is realized by electronic zooming processing under scanning condition and a high-speed mode in which said pseudo-zoom processing is realized by electronic zooming processing, can be selected.

25. A system according to claim 9, wherein said pseudo-zoom magnification in said pseudo-zoom processing is limited, depending on a kind of film.

26. A system according to claim 9, wherein said pseudo-zoom magnification in said pseudo-zoom processing is limited under an exposure condition.

27. A system according to claim 9, wherein when a photographic date is recorded in said photographed image or corresponding to said photographed image and prior to a process of said pseudo-zoom, said photographic date is read out and recognized, and said recognized photographic date is recorded in said picture area after said process of said pseudo-zoom.

28. A system according to claim 9, wherein said camera is a pseudo-zoom camera comprising:
   at least one of a pseudo-zoom magnification designation unit which designates said pseudo-zoom magnification and a pseudo-zoom pattern designation unit which designates a number representing a pseudo-zoom pattern obtained by patterning said pseudo-zoom pattern; or
   at least one of said pseudo-zoom magnification designation unit and said pseudo-zoom pattern designation unit, and
   a picture area designation unit which designates said picture area,
   wherein any of said pseudo-zoom magnification and said pseudo-zoom magnification number, or any of said pseudo-zoom magnification and said pseudo-zoom magnification pattern in combination with said picture area is recorded as pseudo-zoom information.

* * * * *